United States Patent [19]
Magaha, Jr.

[11] Patent Number: 4,651,930
[45] Date of Patent: Mar. 24, 1987

[54] SHOWER HEAD ATTACHMENT AND LIQUID DETERGENT FOR USE THEREIN

[75] Inventor: George H. Magaha, Jr., Pasadena, Md.

[73] Assignee: Economy Distributors, Inc., Pasadena, Md.

[21] Appl. No.: 680,845

[22] Filed: Dec. 12, 1984

Related U.S. Application Data

[63] Continuation-in-part of Ser. No. 617,261, Jun. 4, 1984, abandoned.

[51] Int. Cl.[4] .......................... B05B 7/30; G09F 7/00; F16K 31/60

[52] U.S. Cl. .................................... 239/318; 239/414; 239/578; 251/294; 222/133; 137/894; 40/617; 434/156; 116/205; 116/255; 116/DIG. 17

[58] Field of Search ............ 239/310, 318, 414, 590.5, 239/578; 251/294; 222/129.2, 133; 137/888, 892, 893, 894; 4/615, 596, 191, 192; 40/617; D23/25, 26, 160; 434/156, 112, 113; 206/459; 116/205, DIG. 17, 255

[56] References Cited

U.S. PATENT DOCUMENTS

| | | | |
|---|---|---|---|
| D. 70,708 | 7/1926 | Stuart | D23/25 |
| D. 282,197 | 1/1986 | Hu | D23/25 |
| 1,816,642 | 7/1931 | Fetter | 116/205 X |
| 2,532,202 | 11/1950 | Steinbachner | 16/122 X |
| 3,106,345 | 10/1963 | Wokowitz | 239/318 |
| 3,206,126 | 9/1965 | Thompson | 251/294 |
| 3,291,395 | 12/1966 | Sharp | 239/318 |
| 3,445,067 | 5/1969 | Sheldall | 239/318 |
| 3,447,753 | 6/1969 | Proctor et al. | 239/318 X |
| 3,764,074 | 10/1973 | James | 239/318 |
| 3,797,747 | 3/1974 | Buzzi et al. | 239/318 X |
| 4,027,822 | 6/1977 | Usher | 239/310 X |
| 4,257,342 | 3/1981 | Ditto | 40/617 X |

*Primary Examiner*—Joseph F. Peters, Jr.
*Assistant Examiner*—Mary Beth O. Jones
*Attorney, Agent, or Firm*—Leonard Bloom

[57] ABSTRACT

A shower head attachment has a liquid detergent reservoir and facilitates a "soap," "rinse," and "off" cycle. The attachment has a body provided with a rotary valve having a transverse port. The port is alined, selectively, with a first or second longitudinal inclined passageway formed in the body forwardly of the valve. A third passageway of critical internal diameter communicates the first passageway with an opening formed in a depending neck on the body and acts as an aspirating passageway. A sleeve is secured within the opening and carries a depending feed tube. The feed tube extends into a reservoir or bottle of liquid detergent that is removably mounted on the depending neck of the body, externally of the sleeve. The sleeve has a valve seat above the feed tube, and a ball check valve is seated on the valve seat. The valve carries an external handle; and the ends of the handle carry depending cables, the ends of which are provided with respective tabs. A pin on the body is received in an arcuate slot in the handle to limit the rotary movement of the handle and valve. The liquid detergent is biodegradable and cooperates with the aspirating passageway to prevent clogging. It is critical that the liquid detergent has the proper viscosity relative to the internal diameter of the aspirating passageway so that the detergent is aspirated out of the bottle and into the shower head attachment at the desired rate.

22 Claims, 7 Drawing Figures

SHOWER HEAD ATTACHMENT AND LIQUID DETERGENT FOR USE THEREIN

REFERENCE TO CO-PENDING APPLICATION

This is a continuation-in-part of now abandoned Application Ser. No. 617,261, filed June 4, 1984, the disclosure of which is incorporated herein in its entirety.

FIELD OF THE INVENTION

The present invention relates to a shower head attachment with a liquid detergent reservoir and having a "soap" position, a "rinse" position, and an "off" position; and more particularly, to an overall structural arrangement of a shower head attachment that may be manufactured easily and economically for widespread marketing and distribution, and which is adapted for use with a liquid detergent having specific properties.

BACKGROUND OF THE INVENTION

In the prior art, various shower head attachments and related devices have been disclosed having means therein for selective aspiration of a liquid detergent or the like from a reservoir, which may consist of a bottle removably mounted to the attachment or other device. These prior art structures are fairly complex, hence are difficult and expensive to manufacture; are difficult to install; are not dependable in delivering the desired amount of liquid detergent and are subject to clogging after repeated usage and thus unreliable in operation; and do not provide a simple and effective three-position mechanism that may be manipulated conveniently for "soap," "rinse," and "off" cycles, respectively.

SUMMARY OF THE INVENTION

Accordingly, it is an object of the present invention to alleviate the disadvantages and deficienices of the prior art by providing a relatively simple, low cost, efficient and reliable shower head attachment, one that may be manufactured economically for widespread consumer usage.

It is another object of the present invention to provide a shower head attachment that may be readily installed by the purchaser without requiring special tools or lengthy instructions.

It is yet another object of the present invention to provide a shower head attachment that may be manipulated easily and conveniently by all family members.

It is a further object of the present invention to provide a shower head attachment using a liquid detergent which is of the proper viscosity and which is substantially biodegradable, in combination with an aspirating passageway of a given diameter, thereby preventing the incorrect rate of aspiration and avoiding the build-up of residues, thus solving the delivery and clogging problems inherent in the prior art.

More specifically, applicant has discovered that if the liquid detergent (and any additives therein) is substantially biodegradable and is of the proper viscosity, and if the internal diameter of the cylindrical aspirating passageway is within the range of substantially 0.060 to 0.120 inches, that the detergent will be properly through the passageway at the desired rate without build-up of residue and eventual clogging through repeated usage of the shower head attachment.

In accordance with the teachings of the present invention, there is disclosed herein a preferred embodiment of an improved shower head attachment which includes a main body portion. The body includes a rearward portion having means for attachment to the shower head and further includes a substantially closed forward portion having first and second passageways formed therein. A nozzle is carried on the body forwardly thereof and is in communication with the first and second passageways. The body further has a transverse bore formed therein intermediately of its forward and rearward portions. A valve is rotatably mounted in the transverse bore, has at least three positions, and further has a transverse port formed therein. The body further has a depending neck portion provided with an opening therein, and the body further has a third passageway formed therein communicating the first passageway with the opening in the neck portion of the body. A bottle of liquid detergent which has specific properties is removably mounted on the neck portion and depends therefrom. A sleeve is mounted in the opening, and a check valve means is provided within the sleeve A feed tube is carried by the sleeve and depends therefrom into the bottle of liquid detergent. In a first position of the valve, the transverse port in the valve communicates the rearward portion of the body with the first passageway for flow of water therethrough and to the nozzle, whereby liquid detergent is aspirated through the feed tube and into the sleeve past the check valve means therein, and via the third passageway into the first passageway. This constitutes a "soap" position of the valve. In a second position of the valve, the transverse port in the valve communicates the rearward portion of the body with the second passageway for flow of water therethrough to the nozzle without aspiration of liquid detergent, thereby constituting a "rinse" position of the valve. In the third position of the valve, the valve blocks water flow into either the first or second passageways, thereby constituting an "off" position of the valve.

The foregoing and other objects of the present invention will become apparent from a reading of the following specification, taken in conjunction with the enclosed drawings.

GENERAL DESCRIPTION OF THE PREFERRED EMBODIMENT

Figure 1:
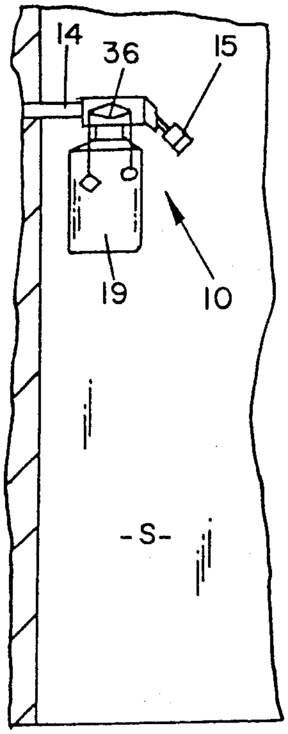
FIG. 1 is a pictorial view showing the shower head attachment of the present invention within a typical shower stall.
Figure 3:
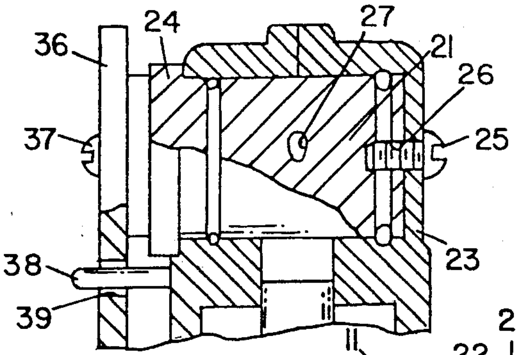
FIG. 3 is a section view taken along the lines 3—3 of FIG. 2, showing a rotatable valve within a transverse bore in the body of the attachment, and further showing an externally accessible handle coupled to the valve for rotation in unison.
Figure 2:
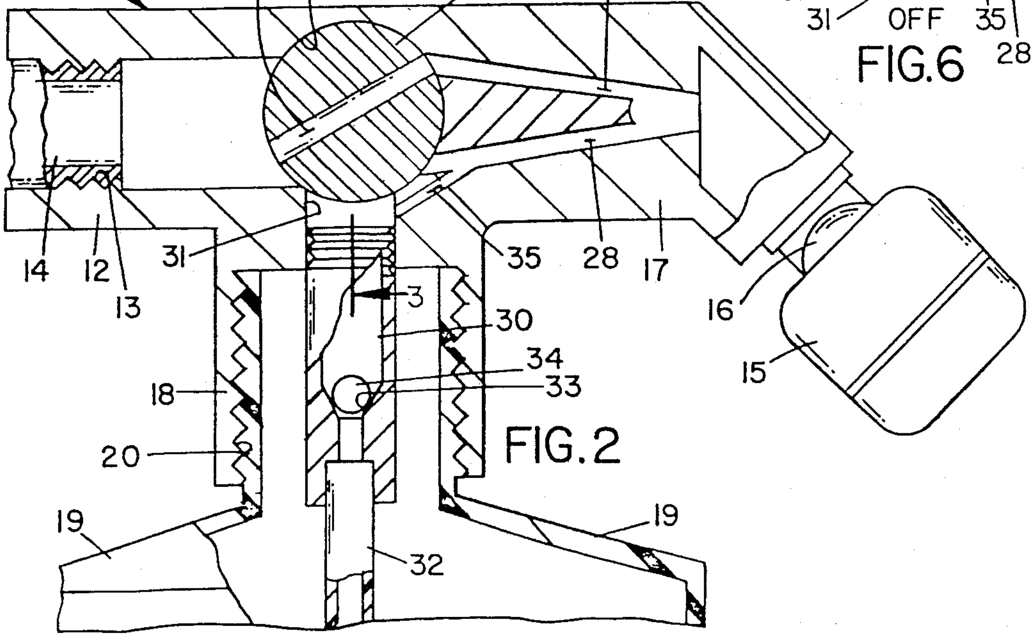
FIG. 2 is a portion of the shower head attachment of FIG. 1, drawn to an enlarged scale, and with parts broken away and sectioned.

With reference to FIGS. 1–3, the shower head attachment 10 of the present invention is adapted for use with a shower S.

The attachment 10 includes a body 11 having a tubular rearward portion 12 provided with internal threads 13 for removable connection to a pipe 14 of the shower. A suitable nozzle 15, which is preferably provided with a swivel mounting 16, is carried on a forward portion 17 of the body. The body also has a depending neck portion 18, and a bottle 19 (or other suitable reservoir) of liquid detergent or the like is removably mounted within the neck by cooperating threads 20.

A cylindrical valve 21 is rotatably journaled within a transverse bore 22 formed in the body 11 intermediately of its forward and rearward portions. The bore 22 is preferably formed as a blind axial bore, such that the valve seats against a raised boss 23 on the body. The valve has a flange 24 engaging the other side of the body, and the valve is preferably retained within the transverse bore in the body by means of a screw 25 passing through the boss and received in a tapped recess 26 in the valve.

A transverse port 27 is formed in the valve and cooperates, alternately, with first and second longitudinal passageways 28 and 29, respectively, formed in the forward portion of the body. Preferably, these passageways are inclined and converge forwardly of the body, as shown more clearly in FIG. 2.

Figure 7:
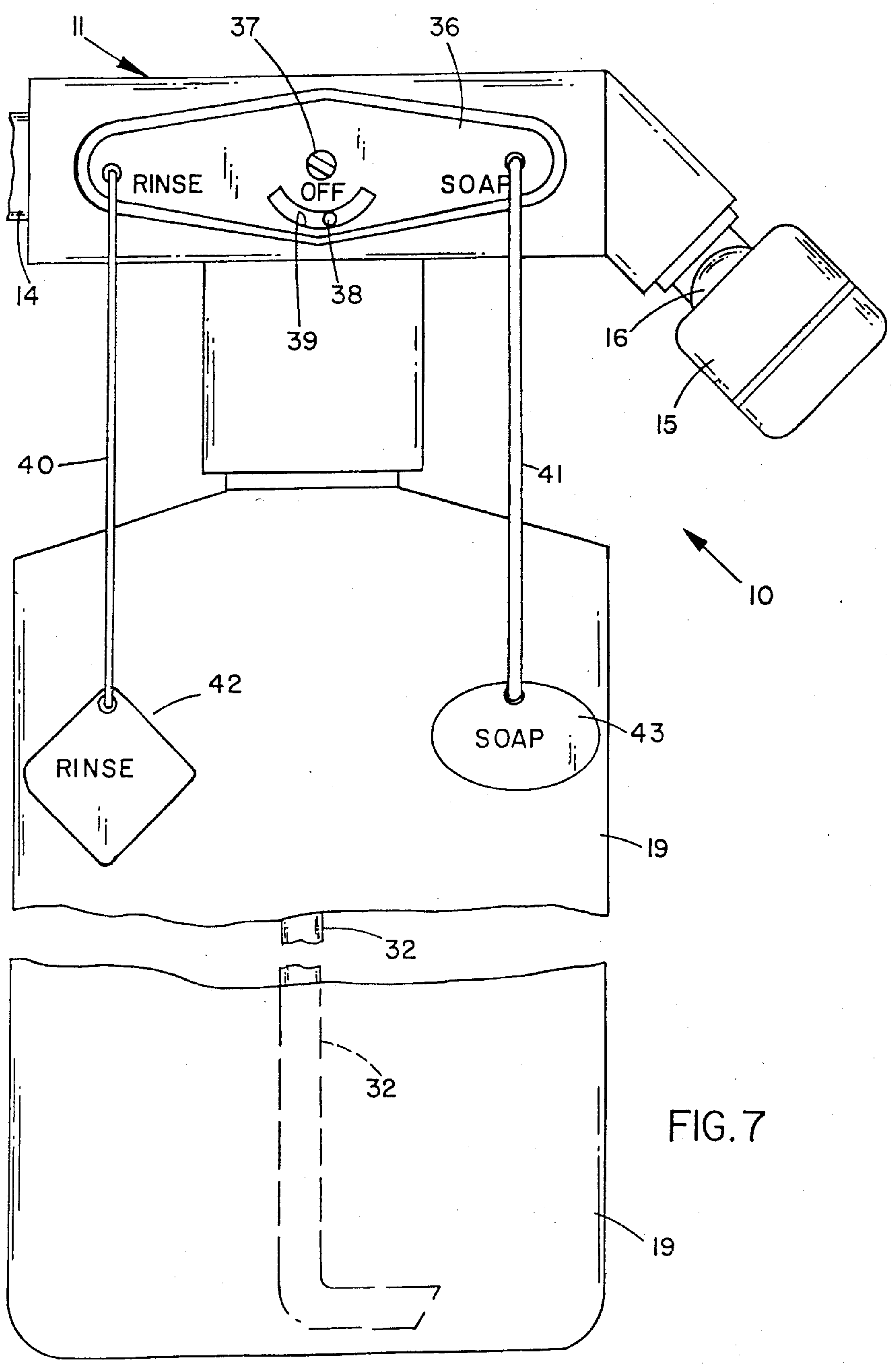
FIG. 7 is an enlarged elevation of the shower head attachment of the present invention, as viewed in FIG. 1.

A sleeve 30 is secured within an opening 31 formed within the depending neck portion of the body and extends downwardly therefrom into the top of the bottle of liquid detergent. A feed tube 32 (which may be made conveniently of plastic) is carried by the lower portion of the sleeve and extends downwardly therefrom into the bottle, as shown more clearly in FIG. 7. The sleeve has a restricted portion forming a valve seat 33, and a ball check valve 34 is seated on the valve seat. A third relatively-short upwardly-inclined passageway 35 (comprising a substantially cylindrical aspirating passageway) is formed in the body and communicates the first passageway with the opening in the neck portion of the body, above the sleeve.

With reference again to FIGS. 3 and 7, a handle 36 is coupled to the valve for conjoint rotation in unison. Preferably, the handle is secured to the valve by a screw 37. A pin 38 is mounted in the body and is received in an arcuate slot 39 formed in the handle, thereby forming respective abutments or stops to limit the pivotal movement of the handle and the valve coupled thereto. Cables 40 and 41 (or the like) are carried by the ends of the handle, respectively, and terminate in respective tabs 42 and 43. Tab 42 (for "rinse") has a geometric form or plan outline which is in the form of a square, while tab 43 (for "soap) is in the form of an oval. This will enable the tabs to be easily recognized (by their feed) and the handle to be conveniently manipulated by the user of the shower.

Figure 4:
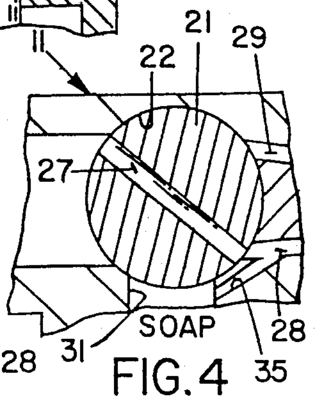
FIGS. 4, 5 and 6 are schematic views, corresponding to a portion of FIG. 2, and illustrating the "soap," "rinse," and "off" positions of the valve, respectively.
Figure 5:
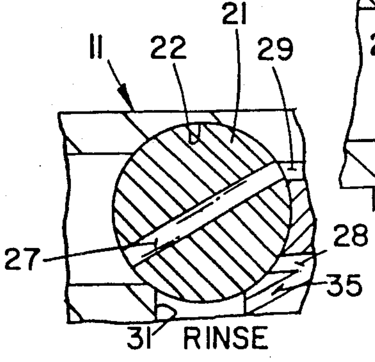
Figure 6:
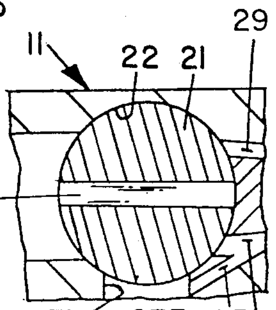

With reference to FIGS. 4–6, the operation of the present invention will become readily apparent.

In FIG. 4, the transverse port 27 in the rotary valve 21 is alined with (that is, in communication with) the first longitudinal inclined passageway 28 for the passage of water therethrough. The flow of the water through the passageway 28 siphons or aspirates the liquid detergent out of the bottle 19 through the feed tube 32, past the ball check valve 34, into the sleeve 30, and through the third passageway 35 into the first passageway 28. This is the "soap" portion of the valve. In this position, the ball check valve 34 prevents water from flowing back down into the bottle 19.

In FIG. 5, the transverse port 27 in the rotary valve 21 is alined with the second inclined longitudinal passageway 29. The first passageway 28 is blocked by the valve, and accordingly, no liquid detergent is siphoned out of the reservoir via third passageway 35. This is the "rinse" position of the valve.

In FIG. 6, the valve is in a position intermediate to its "soap" and "rinse" positions (FIGS. 4 and 5, respectively). The water flow through the shower attachment is blocked, and this is the "off" position of the valve.

With this arrangement, both soap and hot water are conserved; the shower actually takes less time, yet is equally refreshing; and the attachment may be manipulated easily and conveniently by the user. The overall shower attachment is efficient and reliable, relatively low-cost for mass production and distribution, and may be readily installed by the average homeowner.

The third (aspirating) passageway 35 has an internal diameter which is substantially within the range of about 0.060 to about 0.120 inch, and preferably, about 0.090 inch. The liquid detergent within the bottle 19 is of a viscosity that will be aspirated from the bottle at the desired rate and is formulated (by conventional means) so as to be substantially (and preferably, completely) biodegradable. The detergent may be provided with one or more additives, such as a suitable foaming agent and a fragrance, and constitutes a homogeneous mixture which will not "settle out" to the bottom of the bottle, hence will not require removal and repeated shaking. These additives are also biodegradable, hence will not affect the environment. More importantly, the viscosity and biodegradable qualities of the detergent (and its additives) cooperate with the carefully selected internal diameter of the third (aspirating) passageway 35 to assure two results: one, the liquid detergent will be properly aspirated at the desired rate by the water flow to accomplish the desired "soaping" result; and two, the detergent (and its additives) will not cause a build-up of residue (or film) within the aspirating passageway, especially, so as to prevent any substantial clogging of the passageway despite frequent use of the shower head over a substantially long period of time.

In addition to being biodegradable, it is critical that the liquid detergent be of a viscosity such that it will be aspirated through the third (aspirating) passageway 35 at the desired rate. There is thus a relationship between the internal diameter of third passageway 35 and the viscosity of the detergent. Accordingly, if the liquid detergent is too fluid, it will be aspirated through third passageway 35 at too fast a rate and thus be wasted. On the other hand, if the detergent is too viscous, it will not be aspirated through third passageway 35 rapidly enough to be present in water discharged from the shower head attachment in sufficient concentration to be effective. It has been found that the liquid detergent of this invention idealy has a Brookfield viscosity at 25° C. within the range of about 1500 to about 2500 centipoises (cps) and preferably a Brookfield viscosity at 25° C. of about 2100 cps.

A preferred liquid detergent used in the practice of this invention is a biodegradable coconut oil amide combined with sulfonate having both nonionic and anionic surfactant characteristics. It is a clear, homogeneous, viscous liquid which acts as a foamer, foam builder, wetting agent, viscosity modifier and emulsifier. It has the added advantage of retaining its viscosity on dilution with water so that when diluted 7:1 with water on a volume to volume basis it is essentially as viscous as a 100% concentrate. For the purposes of this invention, this detergent may be diluted with water on a volume to volume basis in the ratio of about 4:1 to about 10:1 (with about 7:1 being preferred) of water to detergent. The detergent may also contain other additives such as a fragrance, all of which are preferably biodegradable. As a shampoo, this detergent diluted 7:1 with water on a volume to volume basis gives rich, abundant lather, provides emolliency to the hair, and retains its viscosity.

Obviously, many modifications may be made without departing form the basic spirit of the present invention. For example, in lieu of an "attachment," the shower head itself could include the teachings of the present invention. Also, the device may be made of brass, plastic or other suitable materials and suitably cast and bored, as required. Accordingly, it will be appreciated by those skilled in the art that within the scope of the appended claims, the invention may be practiced other than has been specifically described herein.

I claim:

1. A shower head for a bathroom shower, comprising a body having a generally longitudinal axis and including a rearward portion having means for attachment to a pressurized water source, the body further including a forward portion having first and second passageways formed therein, a nozzle carried on the body forwardly thereof and in communication with the first and second passageways, the body further having a transverse bore formed therein intermediately of its forward and rearward portions, the bore being transverse to a vertical plane encompassing the longitudinal axis of the body, a valve rotatably mounted in the transverse bore and having at least three positions including first, second and third positions, respectively, handle means accessible laterally of the body for rotating the valve, the valve comprising a substantially cylindrical member having a single transverse port formed therein, the body further having a depending neck portion provided with an opening therein, the body further having a third aspirating passageway formed therein communicating the first passageway with the opening in the neck portion of the body, the third aspirating passageway being inclined to the first passageway and intersecting the first passageway near the beginning thereof substantially close to the rotatable valve, a bottle of liquid detergent removably mounted on the neck portion and depending therefrom, and means communicating the bottle with the third passageway, whereby in the first position of the valve, the transverse port in the valve communicates the rearward portion of the body with the first passageway for flow of water therethrough and to the nozzle, whereby liquid detergent is aspirated from the bottle and via the third passageway into the first passageway, thereby constituting a "soap" position of the valve; and whereby in the second position of the valve, the transverse port in the valve communicates the rearward portion of the body with the second passageway for flow of water therethrough to the nozzle without aspiration of liquid detergent, thereby constituting a "rinse" position of the valve; and whereby in the third position of the valve, the valve blocks water flow into either the first or second passageways, thereby constituting an "off" position of the valve; wherein the handle means has respective ends, and wherein first and second cables are carried by the respective ends of the handle means.

2. The shower head of claim 1, further including a pin mounted on the body, and the handle means including a handle having an arcuate slot formed therein to receive the pin, whereby the ends of the arcuate slot provide stops for limiting the rotary movement of the handle and the valve mounted thereto.

3. The shower head of claim 1, wherein a tab is carried on the end of each cable, the tabs having respective geometric plan outlines which are different from one another.

4. The shower head of claim 1, wherein the first and second passageways are inclined and converge towards each other forwardly of the body.

5. A shower head attachment, comprising a body having a generally longitudinal axis and including a rearward portion having means for attachment to the shower head, the body further including a substantially closed forward portion having first and second passageways formed therein, a nozzle carried on the body forwardly thereof and in communication with the first and second passageways, the body having a transverse bore formed therein intermediately of its forward and rearward portions, the bore being transverse to a vertical plane encompassing the longitudinal axis of the body, a valve comprising a substantially cylindrical member rotatably mounted in the transverse bore and having at least three positions including first, second and third positions, respectively, an external handle disposed laterally of the body and mounted to the valve for rotation in unison, stop means between the handle and the body for limiting the rotary movement of the handle and the valve mounted thereto, first and second cables carried by the respective ends of the handle, a tab carried on the end of each cable, the tabs having respective geometric plan outlines which are different from one another, the valve having a transverse port formed therein, the body having a depending neck portion provided with an opening formed therein, the body further having a third aspirating passageway formed therein communicating the first passageway with the opening in the neck portion, the third aspirating passageway being inclined to the first passageway and intersecting the first passageway near the beginning thereof substantially close to the rotatable valve, a bottle of liquid detergent removably mounted on the neck portion and depending therefrom, and a feed tube means depending into the bottle of liquid detergent and communicating with the opening in the neck portion; whereby in the first position of the valve, the transverse port in the valve communicates the rearward portion of the body with the first passageway for flow of water therethrough and to the nozzle, whereby liquid detergent is aspirated through the feed tube means and via the third passageway into the first passageway, thereby constituting a "soap" position of the valve; and whereby in the second position of the valve, the transverse port in the valve communicates the rearward portion of the body with the second passageway for flow of water therethrough to the nozzle without aspiration of liquid detergent, thereby constituting a "rinse" position of the valve; and whereby in the third position of the valve between its first and second positions, the valve blocks water flow into either the first or second passageways, thereby constituting an "off" position of the valve.

6. The shower head attachment of claim 5, wherein the third passageway is substantially cylindrical and has an internal diameter of substantially in the range from 0.060 to 0.120 inches, and wherein the liquid detergent has additives therein, which together with the detergent are substantially biodegradable, whereby the detergent will be aspirated through the third passageway without build-up of residue and eventual clogging through repeated usage of the shower head attachment.

7. The shower head attachment of claim 6, wherein the liquid detergent is substantially homogeneous and does not settle and contains a foaming agent.

8. The shower head of claim 1, wherein the liquid detergent has a plurality of additives, at least one of which comprises a foaming agent, the detergent and its additives being substantially homogeneous and biodegradable, and wherein the third aspirating passageway is cylindrical and has an internal diameter of approximately 0.90 inches, whereby the detergent will be aspirated through the third aspirating passageway without build-up of residue and eventual clogging through repeated usage of the shower head.

9. A shower head for a bathroom shower, comprising a body having a generally longitudinal axis and including a rearward portion having means for attachment to a pressurized water source, the body further including a forward portion having first and second passageways formed therein, a nozzle carried on the body forwardly thereof and in communication with the first and second passageways, the body further having a transverse bore formed therein intermediately of its forward and rearward portions, the bore being transverse to a vertical plane encompassing the longitudinal axis of the body, a valve rotatably mounted in the transverse bore and having at least three positions including first, second and third positions, respectively, handle means accessible laterally of the body for rotating the valve, the valve comprising a substantially cylindrical member having a single transverse port formed therein, the body further having a depending neck portion provided with an opening therein, the body further having a third aspirating passageway formed therein communicating the first passageway with the opening in the neck portion of the body, the third aspirating passageway being inclined to the first passageway and intersecting the first passageway near the beginning thereof substantially close to the rotatable valve, said third aspirating passageway having an internal diameter substantially in the range of about 0.060 to about 0.120 inch, a bottle of liquid detergent removably mounted on the neck portion and depending therefrom, and a feed tube means carried by the neck portion and depending therefrom into the bottle of liquid detergent; whereby in the first position of the valve, the transverse port in the valve communicates the rearward portion of the body with the first passageway for flow of water therethrough and to the nozzle, whereby liquid detergent is aspirated through the feed tube means and via the third passageway into the first passageway without the introduction of external air, thereby constituting a "soap" position of the valve; and whereby in the second position of the valve, the transverse port in the valve communicates the rearward portion of the body with the second passageway for flow of water therethrough to the nozzle without aspiration of liquid detergent, thereby constituting a "rinse" position of the valve; and whereby in the third position of the valve, the valve blocks water flow into either the first or second passageways, thereby constituting an "off" position of the valve, wherein said liquid detergent is biodegradable and has a Brookfield viscosity at 25° C. within the range of about 1500 to about 2500 centipoises, and wherein the handle means has respective ends, and wherein first and second cables are carried by the respective ends of the handle means.

10. A shower head attachment for a bathroom shower, comprising a body having a generally longitudinal axis and including a rearward portion having means for attachment to the shower head, the body further including a substantially closed forward portion having first and second passageways formed therein, a nozzle carried on the body forwardly thereof and in communication with the first and second passageways, the body having a transverse bore formed therein intermediately of its forward and rearward portions, the bore being transverse to a vertical plane encompassing the longitudinal axis of the body, a valve comprising a substantially cylindrical member rotatably mounted in the transverse bore and having at least three positions including first, second and third positions, respectively, an external handle mounted to the valve laterally of the body for rotation in unison, stop means for limiting the rotary movement of the handle and the valve mounted thereto, first and second cables carried by the respective ends of the handle, a tab carried on the end of each cable, the tabs having respective geometric plan outlines which are different from one another, the valve having a single transverse port formed therein, the body having a depending neck portion provided with an opening formed therein, the body further having a third aspirating passageway formed therein communicating the first passageway with the opening in the neck portion, the third aspirating passageway being inclined to the first passageway and intersecting the third passageway near the beginning thereof substantially close to the rotatable valve, and wherein said third aspirating passageway has an internal diameter substantially in the range of about 0.060 to about 0.120 inch, a bottle of liquid detergent removably mounted on the neck portion and depending therefrom, and a feed tube means carried by the neck portion and depending into the bottle of liquid detergent; whereby in the first position of the valve, the transverse port in the valve communicates the rearward portion of the body with the first passageway for flow of water therethrough and to the nozzle, whereby liquid detergent is aspirated through the feed tube means and via the third passageway into the first passageway without the introduction of external air, thereby constituting a "soap" position of the valve; and whereby in the second position of the valve, the transverse port in the valve communicates the rearward portion of the body with the second passageway for flow of water therethrough to the nozzle without aspiration of liquid detergent, thereby constituting a "rinse" position of the valve; and whereby in the third position of the valve between its first and second positions, the valve blocks water flow into either the first or second passageways, thereby constituting an "off" position of the valve, and wherein said liquid detergent is biodegradable and has a Brookfield viscosity at 25° C. within the range of about 1500 to about 2500 centipoises.

11. The shower head attachment of claim 10, wherein said stop means comprises a pin mounted on the body and an arcuate slot formed in the handle to receive said pin, whereby the ends of said arcuate slot provide stops for limiting the rotary movement of the handle and the valve mounted thereto.

12. The shower head attachment of claim 11, wherein said liquid detergent has additives therein which are biodegradable.

13. The shower head attachment of claim 12, wherein one of said additives is a foaming agent.

14. The shower head attachment of claim 12, wherein said liquid detergent is substantially homogeneous and the components thereof will not separate.

15. The shower head attachment of claim 14, wherein said third aspirating passageway has an inner diameter of about 0.090 inch.

16. The shower head attachment of claim 15, wherein said liquid detergent has a Brookfield viscosity at 25° C. of about 2100 centipoises.

17. The shower head attachment of claim 12, wherein said liquid detergent comprises a coconut oil amide and a sulfonate and has both nonionic and anionic surfactant characteristics.

18. The shower head attachment of claim 17, wherein said liquid detergent is diluted with water on a volume to volume basis in the ratio of about 4:1 to about 10:1 water to detergent.

19. The shower head attachment of claim 18, wherein said liquid detergent is diluted with water on a volume to volume basis in the ratio of about 7:1 water to detergent.

20. A liquid detergent for use in the shower head attachment of claim 10, comprising a biodegradable coconut oil amide and a sulfonate wherein said detergent has both nonionic and anionic surfactant characteristics.

21. The liquid detergent of claim 20, wherein said detergent contains biodegradable additives.

22. The liquid detergent for use in the shower head attachment of claim 10, comprising a biodegradable coconut oil amide and a sulfonate wherein said detergent has both nonionic and anionic surfactant characteristics and has a Brookfield viscosity at 25° C. of about 2100 centipoises and wherein said detergent is diluted with water on a volume to volume basis in the ratio of about 7:1 water to detergent.

* * * * *